United States Patent [19]

Goto et al.

[11] Patent Number: 4,970,716
[45] Date of Patent: Nov. 13, 1990

[54] PROTOCOL INTEGRATING VIDEOTEX COMMUNICATION SYSTEM

[75] Inventors: Hiroshi Goto, Yokohama; Yoji Shibata, Yokosuka, both of Japan

[73] Assignee: Hitachi, Ltd., Tokyo, Japan

[21] Appl. No.: 320,606

[22] Filed: Mar. 8, 1989

[30] Foreign Application Priority Data

Mar. 9, 1988 [JP] Japan ............................. 63-53792

[51] Int. Cl.$^5$ .............................................. H04N 7/16
[52] U.S. Cl. .................................................. 370/58.1
[58] Field of Search ................... 370/58, 60, 62, 58.1; 358/142, 147

[56] References Cited

U.S. PATENT DOCUMENTS 4,739,402 4/1988 Maeda et al. ...................... 358/142
4,805,134 2/1989 Calo et al. ........................... 364/900

FOREIGN PATENT DOCUMENTS 0049748 3/1987 Japan .
0143586 6/1987 Japan .

Primary Examiner—Douglas W. Olms
Assistant Examiner—Melvin Marcelo
Attorney, Agent, or Firm—Antonelli, Terry, Stout & Kraus

[57] ABSTRACT

A protocol integrating videotex communication system includes a group of data base centers conforming to various presentation level protocol syntaxes (PLPS) of a videotex, a plurality of subscriber's terminals conforming to the PLPS of to the group of data base centers, and a device for interconnecting the group of data base centers and the plurality of subscriber's terminals, which includes a gateway unit connected to the plurality of data base centers, a videotex communication control apparatus connected to the gateway unit, and an interconnection unit having a single ISDN exchange apparatus for connecting the videotex communication control apparatus to the plurality of subscriber's terminals.

8 Claims, 6 Drawing Sheets

PROTOCOL INTEGRATING VIDEOTEX COMMUNICATION SYSTEM

BACKGROUND OF THE INVENTION

The present invention relates to a protocol integrating videotex communication system in which data base centers of the CAPTAIN, CEPT, and NAPLPS associated with the videotex presentation level protocol syntax (PLPS) are included in a switching system by use of a gateway apparatus, a videotex communication controller, and an ISDN user/network interface, thereby integrating the service operations.

As the international standards for the videotex PLPS Protocol, there have been recommended three systems including the CAPTAIN, CEPT, and NAPLPS systems; however, the complete interchangability and integration between the different PLPS subscriber's terminals and data base centers remain to be provided.

As a method to solve the problem above, there is known a method described in the Japanese Patent Publication JP-A-62-143586. In this example, as a subscriber's terminal, there is installed a universal terminal having a function of converting a plurality of protocols corresponding to the various PLPS protocols so as to enable videotex communication to be conducted between the single terminal and various kinds of PLPS data base centers. However, since this example requires the conversion functions associated with the respective protocols to be installed in the subscriber's terminal, a problem arises with respect to the cost of the terminal and accommodation thereof.

In addition, Japanese Patent Publication JP-A-62-143586 describes a system in which an identification (ID) transmit function is provided by the subscriber's terminal so that on the data base center side the protocol of the subscriber's terminal is determined depending on the ID, so as to connect the terminal to a communication control unit conforming to the protocol. The system of this configuration is designed to be employed in an environment associated with a telephone network; furthermore, the protocols are limited to the CAPTAIN protocol. Moreover, the object is to access a direct-type information center (DF) for each protocol, which cannot achieve integration of the videotex service.

SUMMARY OF THE INVENTION

It is therefore an object of the present invention to provide a protocol integrating videotex communication system in order to solve the problem of system integration in a videotex communication system in which image information retrieval is conducted between a plurality of subscriber's terminals conforming to different PLPS protocols and the PLPS data base centers corresponding thereto, wherein through a network conforming to a single PLPS protocol between the subscriber's terminals and the data base centers, videotex communication can be conducted between the subscriber's terminals having the same types of PLPS protocols and the data base centers.

The object above can be achieved by configuring a videotex communication controller, constituting the network with a videotex exchange conforming to a single PLPS protocol and a protocol converter conforming to the various PLPS protocols, in which service image information from an arbitrary PLPS data base center selected according to a call control procedure through a signal channel at a call initiation issued from a subscriber, is once converted into a data format of the PLPS to which the videotex exchange conforms and is thereafter subjected to protocol conversion according to a protocol associated with the call initiation terminal in the protocol converter disposed in the videotex communication controller in association with the various PLPS protocols, thereby transmitting the obtained data to the call initiation terminal via the ISDN user/network interface and an exchange.

By using the ISDN user/network interface as the user/network interface, when necessary information, including a terminal class and a service type, is transmitted to a signal (D) channel at a call initiation from a subscriber, the videotex communication controller recognizes the information and establishes a connection via a gateway unit to a data base center desired by the subscriber; furthermore, effects a call termination to a protocol converter disposed in the videotex communication controller in associated with the terminal. In this fashion, after a user session is opened, in the gateway unit, image information which is sent from a data base center and which belongs to a desired videotex PLPS protocol is once converted into the telesoft information format (existing CAPTAIN-PLPS) or into a data format which can be transferred through the network in the transparent mode; thereafter, the information undergoes protocol conversion associated with the terminal in the protocol converter so as to be sent to the call initiation terminal of the user. This enables the user to easily utilize the retrieval service of image information belonging to a desired videotex PLPS.

BRIEF DESCRIPTION OF THE DRAWINGS

The present invention will be apparent from the following detailed description, taken in conjunction with the accompanying drawings in which.

DESCRIPTION OF THE PREFERRED EMBODIMENTS

Referring to the drawings, description will be given of an embodiment according to the present invention. This invention is applicable to the various videotex PLPS protocols in any videotex communications to be effected between subscribers' terminals conforming to the same types of videotex PLPS protocol and data base centers. As an example, a description will be given of the embodiment only in a case where image information conforming to the CEPT-PLPS Protocol is retrieved by means of a videotex exchange according to the CAPTAIN-PLPS Protocol.

Figure 1:
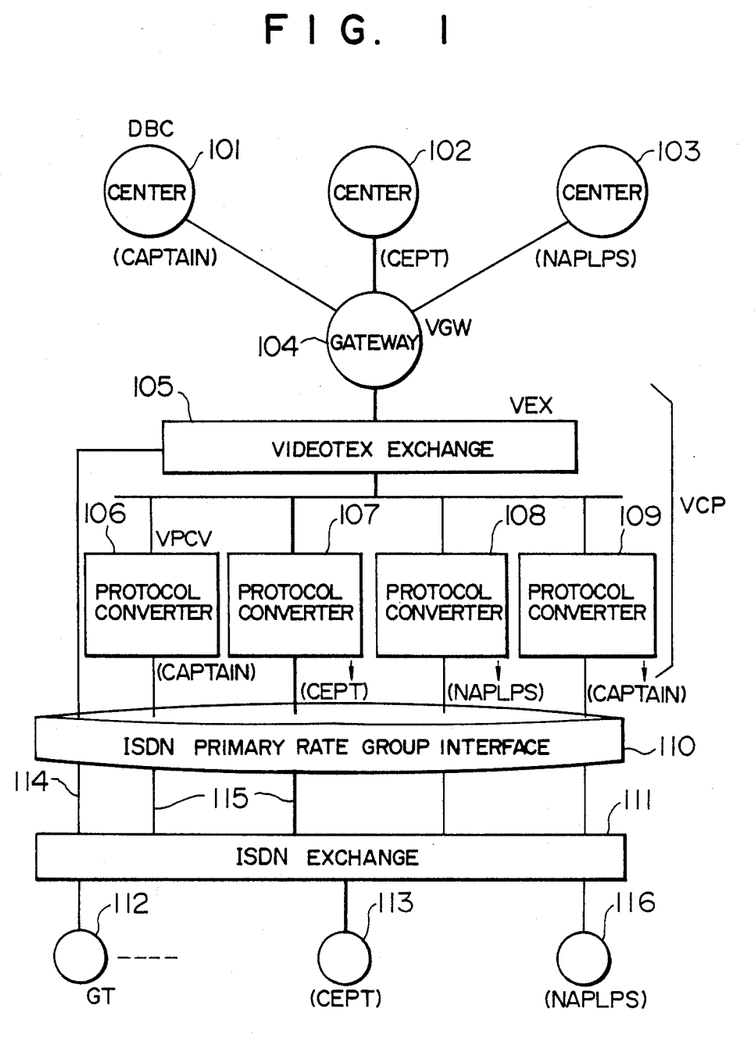
FIG. 1 is a configuration diagram showing an embodiment of a communication system according to the present invention.

First, description will be given of a videotex communication system in accordance with the present invention. FIG. 1 shows an example of the system. In this case, a videotex communication controller (VCP), centered on a videotex exchange (VEX) 105, can be connected to the center side, including the data base centers (DBCs) 101 to 103, corresponding to the respective protocols, via a gateway unit (VGW) 104.

On the other hand, the connection is established to the subscribers' side including an ISDN user/network interface, for example, an ISDN primary group interface 110, via protocol converters 106 to 109, conforming to the various PLPS protocol, and further to an ISDN exchange 111.

The ISDN primary group interface 110 is linked to the ISDN exchange 111 by means of a signal channel 114 and information channels 115.

In the ISDN exchange, there are housed CAPTAIN terminals 112 and other subscribers' terminals 113 and 116 corresponding to the various protocols.

Figure 2:
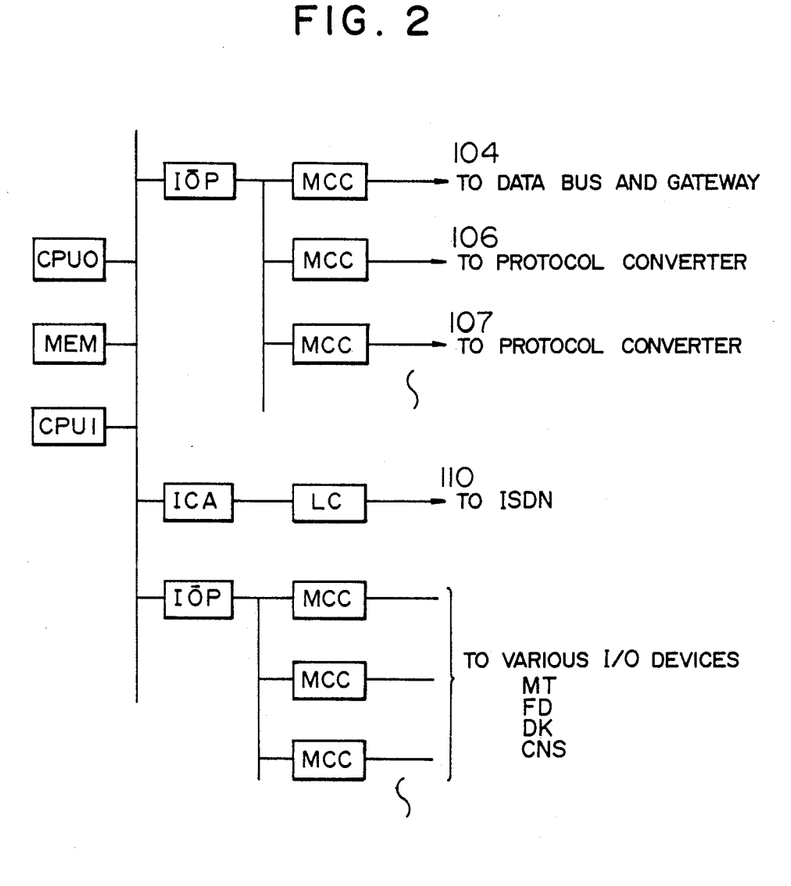
FIG. 2 is a block diagram schematically showing an example of a videotex exchange suitable for use in the system of FIG. 1.
Figure 3:
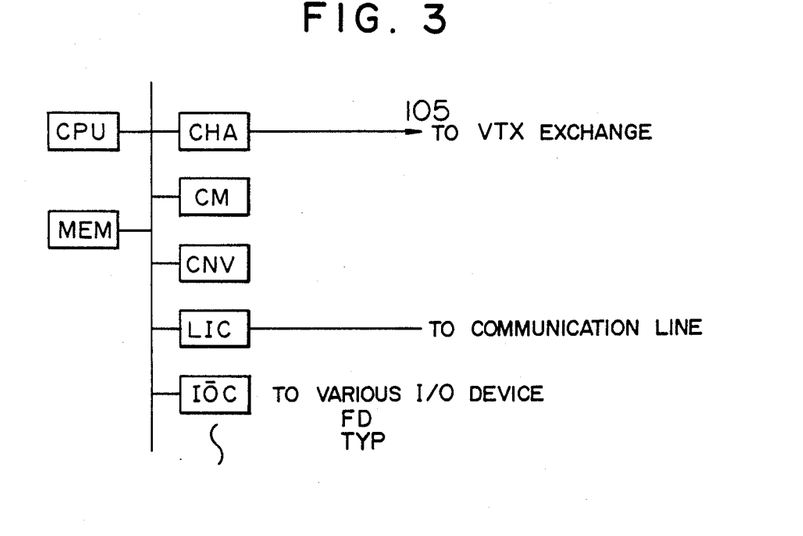
FIG. 3 is a block diagram showing an example of a protocol converter suitable for use in the system of FIG. 1.
Figure 4:
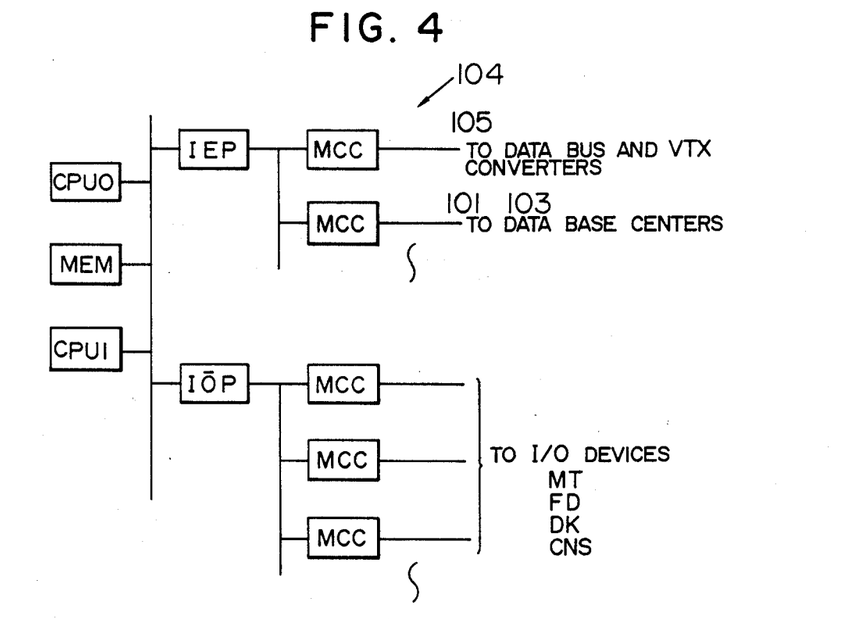
FIG. 4 is a block diagram showing an example of a gateway unit suitable for use in the system of FIG. 1.

Description will now be given of an outline of the configuration with reference to the block diagrams of FIGS. 2 to 4 showing respectively, the videotex exchange 105, the protocol converters 106 to 109, and the gateway unit 104, each constituting the respective primary section according to the present invention.

FIG. 2 is a configuration diagram showing an example of the videotex converter (VEX) 105, which is constituted as a duplicate system including two super minicomputers, CPUs 0 and 1, and a memory, MEM, for storing therein an online program. Furthermore, an overlay portion of the online program is stored in a disk device DK. Call establish information is transferred as D channel information control from a line controller LC to the CPUs via an interface control adapter ICA. The interface between the gateway 104 and the protocol converters 106 to 109 is a channel interface, which is controlled by an I/0 processor IOP and a multichannel controller MCC. In addition, the channel interface is also adopted as the interface for the I/0 devices associated with other device, such as a magnetic tape MT, a floppy disk FD, a hard disk DK, and console CNS.

FIG. 3 is a configuration diagram showing an example of the protocol converters 106 to 109 in which a microprocessor is employed as the CPU thereof and a program is loaded in an initial program loading operation from a floppy disk FD into a memory MEM. This portion may also be implemented by use of a read-only memory ROM. Communications with the videotex exchange 105 is controlled by a channel adapter CHA such that the information is stored in a communication memory CM. The protocol conversion is carried out thereon by a converter CNV according to conversion parameters stored in a ROM integrated therein. Input and output operations with respect to the communication line are effected through a a line interface controller LIC according to the LAPB procedure. In addition, the input and output devices are controlled via an I/0 controller IOC. Furthermore, in this configuration, only the contents of the memory MEM vary among the converters 106 to 109 conforming to the respective PLPS protocols.

In the configuration of FIG. 4, the gateway 104 is constituted in a duplicated system by means of two super minicomputers, CPU 0 and CPU 1, and is interfaced with the videotex exchange 105 and the respective data base centers 102 to 103 through a channel interface so as to be controlled by an I/0 processor IOP and a multichannel controller MCC. This is also the case for the interface with respect to the other input-/output devices.

Assume here that a subscriber issues a call from a terminal associated with CEPT to a data base center 102 corresponding to CEPT so as to effect a retrieve operation of image information conforming to the CEPT-PLPS Protocol. Then processing is conducted according to the procedure of FIG. 5.

Figure 5:
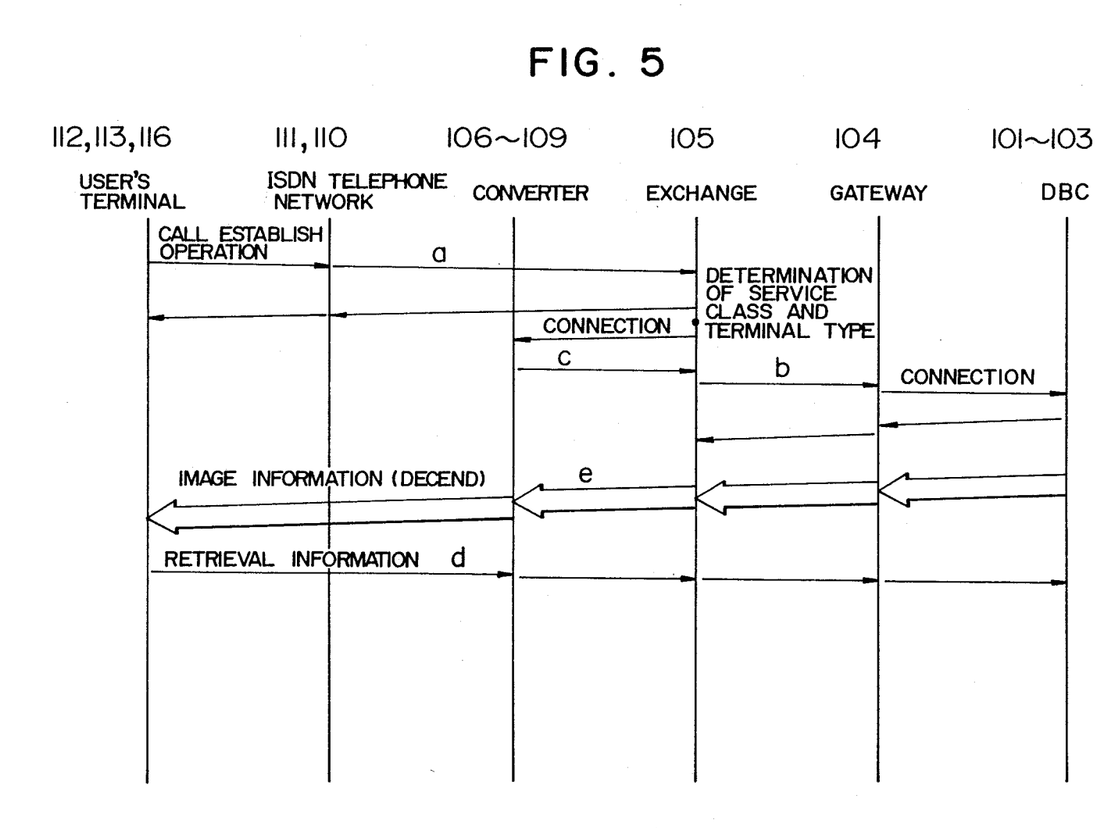
FIG. 5 is an interaction sequence diagram showing a call establish operation and the, subsequent connect processing in the communication system of the present invention.

Call control information issued from the subscriber's terminal 113 at a call issuance from the subscriber includes a terminal class, a service type, a call termination number (a telephone number of the data base center 102 corresponding to CEPT in this case), a protocol identifier, and a call number and is transmitted as control data through the signal channel 114 to the videotex exchange 105, as depicted at intervals (a) in FIG. 5.

Figure 6:
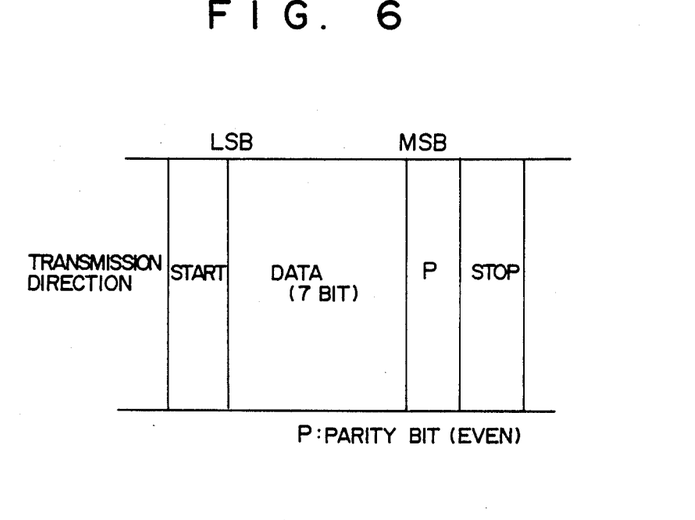
FIG. 6 is a schematic diagram showing an example of information retrieval in the present invention.

The videotex exchange 105 then recognizes and decodes the received call control information so as to request the gateway unit 104 to establish a connection to the data base center 102 associated with CEPT, as depicted at interval (b) in FIG. 5, and to cause the call including the obtained information to be completed to the protocol converter 107 corresponding to CEPT, as depicted at interval (b) in FIG. 5. In this fashion, after an in-channel information path is established indicated by a bold line in FIG. 5, retrieval information, which has, for example, a format of FIG. 6 and which is inputted from the terminal associated with CEPT, is transmitted as data through the information channel 115 to the data base center 102 (d). In this operation, the retrieval information is converted by the protocol converter 107 according to the CAPTAIN-PLPS code system of the ascending direction to the center 102. In the data base center 102, based on the retrieval information, image information desired by the user is obtained and is then sent to the videotex, communication controller VCP, as depicted at interval (e) in FIG. 5.

Figure 7:
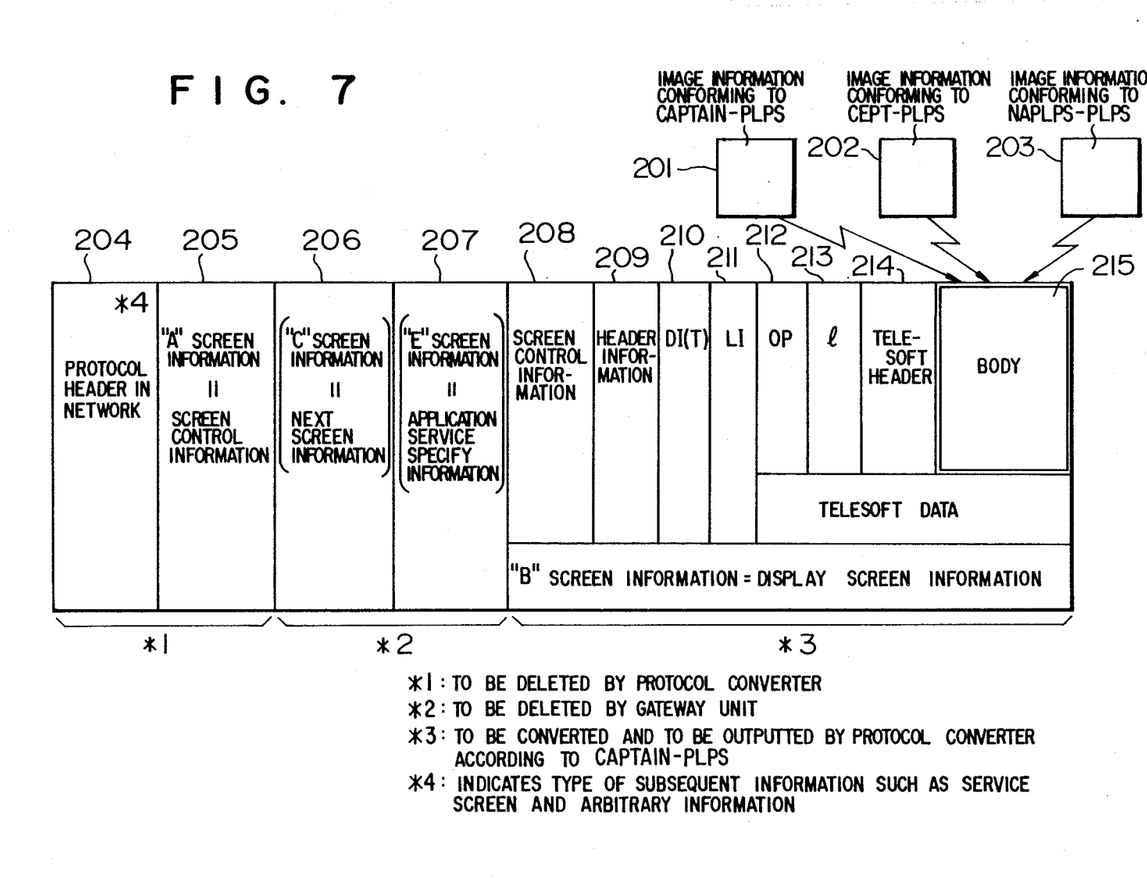
FIG. 7 is a format, diagram showing information transmitted from a data base center in accordance with the present invention.

Referring next to FIG. 7, description will be given of the conversion and transfer procedures of the image information in the videotex network. The image information is communicated between the gateway unit 104 and the protocol converter 107 according to the data format conforming to CAPTAIN-PLPS-telesoft information, including a protocol header in network 204 as the leading item thereof as shown in FIG. 7. The fields of the transfer data formats of FIGS. 7 and 8 respectively have the following functions. Protocol header in network: Indicates a route number, a text ID, a line number, and the like to be communicated through the videotex communication controller VCP. "A" screen information: Specifies an image number, an image density, a display mode, a charge information, and the like for image information. "C" screen information: Designates necessary information items for a screen retrieval associated with image information. "E" screen information: Specifies service items such as a communication work and an order entry. Screen control information: Designates attributes of a screen such as a clear screen, a header raster color, and a screen raster color. Header information: Specifies display contents of the screen header portion.

Figure 8:
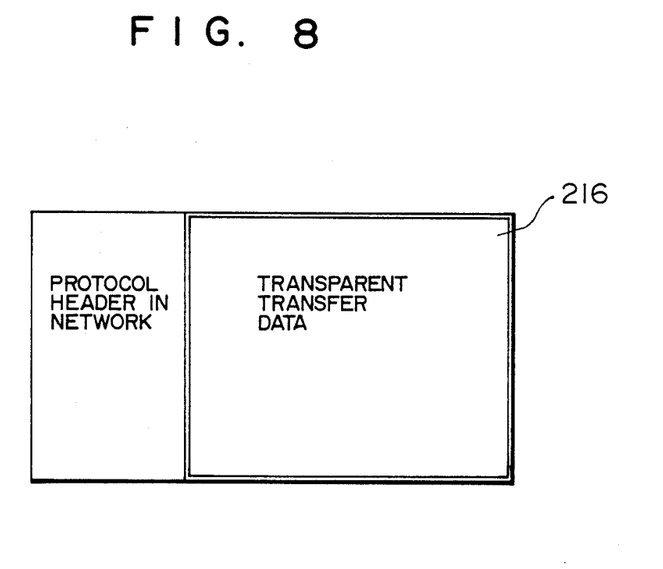
FIG. 8 is a format diagram showing transparent, information sent from the data base center in accordance with the present invention.

DI(T): Data indicator indicating that the subsequent information is transparent data.

LI: Indicates the length of subsequent data belonging to DI(T).

OP: Operation code identifying the data attribute of the subsequent data.

l: Indicates the length of data belonging the associated operation code.

Telesoft header: Indicates that telesoft data follows.

Telesoft data: Data, in the format conforming to the CAPTAIN-PLPS Protocol. With respect to the attribute, this data belongs to the transparent data and is transferred through the network to a terminal in the transparent mode. Interpretation and work of this data are achieved by the terminal. Transparent transfer data: Data of an arbitrary format in which items such as "A" screen information is not included. This data is transferred through the network to a terminal in the transparent mode.

As described above, the gateway unit 104 transmits to the protocol converter the information containing the protocol header in network 204, the "A" screen information 205, the screen control information 208, the header information 209, the data identifier 210, the length indicator 211, the PDU operation code 212 indicating telesoft data, the OP length 213, and the image information as a body 215 preceded by the telesoft header 214 so as to conform to the CPT-PLPS Protocol. On recognizing the image information above, the protocol converter 107 decodes the information based on the A screen information 205 into data in "a" terminal transmission data format defined by the CAPTAIN-PLPS, decodes the image information conforming to the CEPT-PLPS inserted as telesoft data into data in a CEPT-PLPS terminal output format, and then delivers the results as information channel data to the terminal corresponding to the CEPT.

In addition, the other transfer data format is available, namely, as shown in FIG. 8, image information conforming to the CEPT-PLPS is inserted in the format of the transparent transfer data 216 so as to transfer the information through the videotex communication network in the transparent mode.

As described above, by use of a single user/network interface, it is possible to integrally achieve retrieval service operations of image information items belonging to the different videotex PLPS protocols. As a consequence, the retrieval service is available for a particular PLPS, for example, for image information not conforming to the CAPTAIN-PLPS. Furthermore, through a single user/network interface, a connection can be easily established to a desired data base center. Moreover, the user can integrally enjoy the retrieval service of image information items belonging to any videotex PLPS Protocol including the CAPTAIN-PLPS. For implementation of the present invention, there is not required any particular modification of the CAPTAIN-PLPS, and subscriber's terminals associated with the respective protocols are also easily accommodated.

We claim:

1. A protocol integrating videotex communication system comprising:
   a plurality of data base centers, each data base center conforming to a uniquely associated presentation level protocol syntax of a videotex;
   a plurality of subscriber's terminals, each subscriber terminal conforming to an associated one of the presentation level protocol syntaxes and capable of generating call establish information unique to the subscriber terminal for establishing a call to the data base center having the same associated presentation level protocol syntax;
   a gateway unit connected to said plurality of data base centers;
   a single ISDN exchange apparatus connected to said plurality of subscriber's terminals; and
   a videotex communication control apparatus coupling said gateway unit and said ISDN exchange apparatus, and responsive to call establish information from one of said plurality of subscriber terminals for establishing a connection from said one of said plurality of subscriber terminals via said ISDN exchange apparatus, said videotex communication control apparatus, and said gateway unit to the data base center having associated therewith the presentation level protocol syntax associated with said one of said plurality of subscriber terminals;
   said gateway unit then being responsive to retrieval information from said one of said plurality of subscriber terminals for obtaining service image information from the connected data base center and converting the obtained service image information into data having a predetermined data format, and
   said control apparatus then being operative to convert the data having a predetermined data format into data conforming to the protocol associated with said one of said plurality of subscriber terminals,
   whereby the obtained service image information from said connected data base center is transmitted to said one of said plurality of subscriber terminals.

2. A protocol integrating videotex communication system according to claim 1 wherein said videotex communication control apparatus includes a videotex exchange connected to said gateway unit, and a plurality of protocol converters, each protocol converter conforming to a uniquely associated one of the presentation level protocol syntaxes, each protocol converter adapted to establish a connection between said videotex exchange apparatus and said ISDN exchange apparatus.

3. A protocol integrating videotex communication system according to claim 1 wherein said single ISDN exchange apparatus includes an ISDN exchange unit connected to said subscriber terminals and an ISDN primary rate group interface establishing connections between said ISDN exchange unit and said videotex communication control apparatus.

4. A protocol integrating videotex communication system according to claim 1 wherein said ISDN exchange apparatus includes a signal channel for communicating call establish information from said subscriber terminals to said videotex communication control apparatus.

5. A protocol integrating videotex communication system according to claim 1 wherein said ISDN exchange apparatus includes an information channel for transmitting data supplied from said videotex communication control apparatus to the subscriber's terminal.

6. A protocol integrating videotex communication system according to claim 1 wherein said data base centers and said subscriber terminals conform to presentation level protocol syntaxes including at least one of CAPTAIN, CEPT, AND NAPLES.

7. A protocol integrating videotex communication system according to claim 1 wherein said gateway unit converts the obtained service image information into a telesoft information format conforming to CAPTAIN-PLPS.

8. A protocol integrating videotex communication system according to claim 1 wherein said gateway unit converts the obtained service image information into a data format for which a transparent transfer is possible in the system.

* * * * *